Jan. 7, 1936.  A. LA R. PARKER  2,027,285
METHOD OF FORMING SEAMLESS TUBE COUPLINGS
Filed Oct. 6, 1933
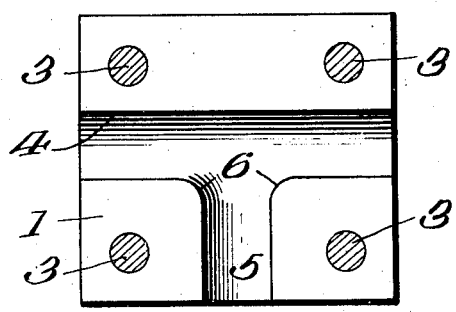
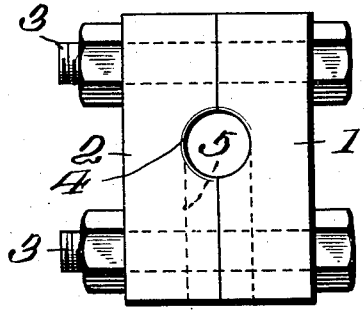
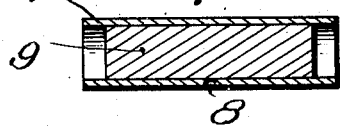
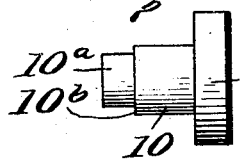
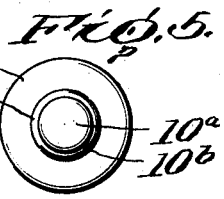
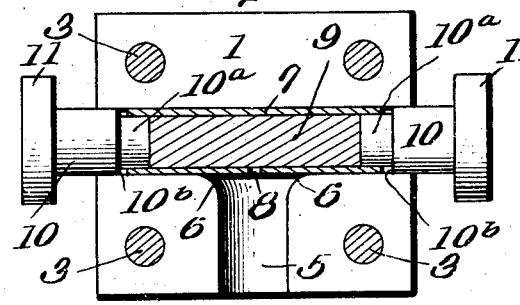
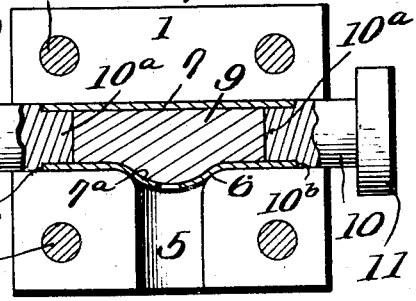
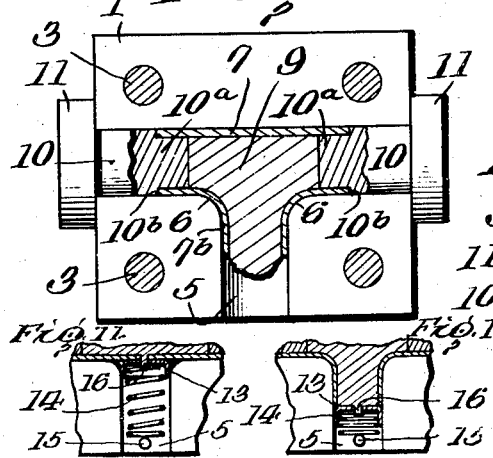
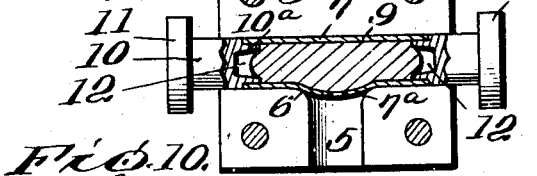
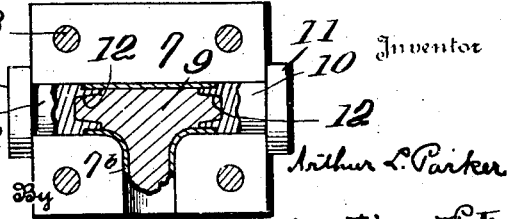
Inventor
Arthur L. Parker
By
Sturtevant, Mason & Porter
Attorneys

UNITED STATES PATENT OFFICE 2,027,285

METHOD OF FORMING SEAMLESS TUBE COUPLINGS

Arthur La Rue Parker, Cleveland, Ohio

Application October 6, 1933, Serial No. 692,541

2 Claims. (Cl. 29—157)

The invention relates to new and useful improvements in a method of making seamless tube couplings such as pipe T's and analogous branch fittings from tubular blanks.

An object of the invention is to provide a method whereby a tubular metal blank may be shaped into the desired form of coupling through the use of a plastic non-compressible material placed within the tubular blank and forcibly re-shaped therein for causing the metal in said tubular blank to flow into the desired shape, and subsequently removing the plastic material from the coupling.

A further object of the invention is to provide a method of forming a coupling from a tubular blank wherein pressure is also applied to the tubular blank for shortening the same to aid in the flowing of the metal of the blank to form a branch in the same.

These and other objects will in part be obvious and will in part be hereinafter more fully described.

In the drawing, which illustrates the essential features of an apparatus for carrying out the method;

Figure 1 is a plan view of one section of a die used for shaping the coupling;

Fig. 2 is a plan view of the die fully assembled;

Fig. 3 is a view in section showing the tubular blank prepared for insertion in the dies and the plastic non-compressible material therein which is utilized for shaping the tubular blank into the desired form of coupling;

Fig. 4 is a side view of one of the mandrels used in the flowing of the plastic material and in the shaping of the coupling;

Fig. 5 is an end view of the same;

Fig. 6 is a view showing one section of the die with the parts assembled therein preparatory to applying pressure for the initial shaping of the coupling;

Fig. 7 is a view similar to Fig. 6 but showing pressure applied to the mandrels for the initial shaping of the tubular blank into the coupling member;

Fig. 8 is a view similar to Fig. 7 but showing the final step in the extrusion of the metal in the tubular blank to form the T-coupling;

Fig. 9 is a view similar to Fig. 7, but showing a slightly modified shaping of the ends of the mandrel;

Fig. 10 is a view similar to Fig. 9 but showing the final step in the extrusion of the metal in the tubular blank to form the T-coupling;

Fig. 11 is a sectional view showing a slightly modified form of die used for shaping the coupling and before pressure has been applied to the plastic material to form the branch in the tubular blank, and Fig. 12 is a similar view, but showing the shaping of the branch by the re-shaping of the plastic material.

Many efforts have been made to re-shape a tubular blank to form a branch therein by the use of a sectional mandrel in conjunction with external die shaping blocks. The present invention resides in a method whereby a plastic non-compressible material may be used in place of a sectional mandrel for the re-shaping of the tubular blank to form a branch or branches therein. The invention as shown in the drawing is applied to the forming of a T-coupling, but it will be understood that it may be used for forming branches in a tubular blank at opposite sides thereof, or at different angles thereto, or in any desired relation to the main portion of the coupling.

In carrying out the invention, a tubular blank is formed of sufficient length to furnish the necessary material for a branch coupling of desired length and thickness of metal. This tubular blank is preferably provided with an opening in the side wall thereof at the location where it is desired to extrude the metal to form the branch connection. A cylinder of plastic non-compressible material, preferably lead, is placed in the tubular blank. This cylinder may be pre-formed and slipped into the blank, or the cylinder may be formed in the tubular blank by casting the same therein. The tubular blank with the plastic material therein is laid in the sectional die which is shaped so as to conform to the external shaping of the desired coupling. When the blank placed in the sectional die has the opening in the side wall thereof, said opening is placed in alinement with the longitudinal axis of the bore of the branch in which the metal is to be extruded in the forming of the coupling. The longitudinal bore through the die sections is of the same diameter as the tubular blank so that it fits snugly within the die sections. Mandrels are used which are shaped so that they may enter the tubular blank and press upon the plastic non-compressible substance therein. When pressure is applied to the mandrels, the plastic non-compressible substance will be reshaped, and the re-shaping of this substance will cause the metal of the blank extending across the branch section of the die to be extruded into said branch section and shaped therein so as to produce the branch member on the tubular blank. The mandrels are preferably shaped so that pressure is first applied to the plastic re-shapable material therein for initiating the extrusion of the metal and the formation of the branch leg of the coupling. After this has been initiated then the mandrel engages the ends of the tubular blank and causes the tubular blank to shorten and the metal thereof to flow as it is being laterally extruded to form this leg of the coupling. It is understood that the pressure applied to the plastic material and to the tubular blank is a progressive increasing pressure and the metal will flow from all around the tubular blank into the side outlet, with the plastic mandrel which is used. When certain metals are being formed into couplings, it may be desirable to heat the molds, while with others it is not necessary. The extruding may take place without the application of heat.

It is thought that the method will be better understood by a detail reference to the drawing which illustrates, the essential features of the apparatus for carrying out the method.

The forming die includes two similarly shaped die sections 1 and 2 which are secured together by suitable bolts indicated at 3—3. Extending through the die sections is a central bore 4 which is cylindrical and is of the desired diameter of the coupling member which is to be formed. Extending laterally from this longitudinal bore 4 is a bore or recess 5 of similar diameter, when it is desired that the central leg of the T-coupling shall be of the same diameter as the end portions of the coupling. The die is shaped at the parts 6 so as to conform to the desired shaping of the coupling. A tubular blank 7 of a suitable ductile material or alloys thereof is used in the forming of the coupling. This tubular blank is of greater length than the length of the coupling which is to be formed and includes sufficient metal so that the re-shaped coupling walls will be of the desired uniform thickness. The blank is preferably provided with an opening 8 intermediate the ends thereof. A cylinder 9 of a plastic non-compressible material, preferably lead, although other materials may be used, is formed and inserted in this tubular blank. This cylinder 9 is preferably sized so that it slips easily within the tubular blank. Instead of preforming the plastic cylinder for insertion in the tubular blank, said plastic material may be flowed into the blank and the cylinder cast therein. The die sections are separated and the tubular blank is laid in the longitudinal recess or bore 4 thereof with the opening 8 in alinement with the lonigtudinal axis of the lateral bore or recess 5. The sections of the die are then firmly clamped together. A mandrel 10 is slipped into each end of the longitudinal bore 4. These mandrels are similar in construction.

As shown in Figs. 4 to 8, the mandrel is provided with a forward portion 10a which is of such diameter that it passes freely into the tubular blank and contacts with the cylinder 9 of plastic non-compressible material. The length of this forward portion 10a is greater than the distance from the extreme end of the tubular blank to the end of the plastic non-compressible material. The central portion of this mandrel is of such a diameter that it slides freely in the bore 4 of the dies. Between this central portion and the forward portion 10a is a shoulder 10b which is brought into contact with the end of the tubular blank after a certain re-shaping of the tubular blank through a re-forming of the semi-plastic material has occurred. The mandrel also includes an outer head 11 which may be of larger diameter if desired. The two mandrels are inserted in the die sections and the forward ends 10a thereof brought into contact with the ends of the plastic non-compressible material. A progressive increasing pressure is then applied to the mandrels for forcing the same inwardly toward each other so as to bring about a re-shaping of the plastic non-compressible material and a re-forming of the tubular blank.

In Fig. 7, the mandrels are shown as having been forced inwardly until the shoulders 10b are brought into contact with the ends of the tubular blank. During this inward movement of the mandrels, the portion 7a of the tubular blank is forced into the lateral bore or recess 5 of the dies. This is caused by a flowing of the metal of the tubular blank and a re-shaping of the plastic substance within the blank. The die confines the plastic material and the blank so that the only way that the blank and plastic material can yield to the pressure applied to the mandrels is by this bulging and extruding of the tubular blank in the direction where there is little or no resistance of the die thereon. After this initial shaping of the branch member of the coupling, further pressure is applied to the mandrels which will not only continue the re-shaping of the plastic non-compressible substance extruding it through the bore 5 of the dies, but will also cause a shortening of the blank and a flowing of the metal in the blank from all points therein to form this branch section of the coupling, and thus creating a coupling wherein the walls are of substantially uniform thickness. When the opening is formed in the side wall of the tubular member and said opening is located in the axial line of the branch bore, the flow of the metal is directed, and the break in the metal which must take place if the extrusion method is carried far enough is localized at the edges of said opening. Without this hole in the side wall of the tubular blank, the metal may crack all the way across the side outlet member which is being formed. This greatly aids in the forming of a tubular branch indicated at 7b in Fig. 8, which is of uniform thickness and length. The pressure of the mandrels against the ends of the tube and the pressure of the plastic material against the walls of the forming branch will produce a tubular branch which is shaped to conform to the walls of the dies. The plastic material will be extruded through the formed branch 7b as shown in Fig. 8. This completes the T-coupling so far as shaping of the body portion and branch is concerned. The ends of the body portion and the ends of the branch will, of course, be shaped, machined and threaded so as to complete the coupling.

In Figs. 9 and 10 there is shown a slightly modified form of mandrel. In this form of mandrel there is a recess 12 in the end of each mandrel. The dimensions of this recess are determined by experiment. It is of less diameter than the end portion 10a of the mandrel so that the mandrel when it is initially inserted in the tubular blank will contact with the plastic non-compressible material and bring about a re-shaping of the same. In Fig. 9 the mandrels are shown as forced inwardly until the shoulders 10b contact with the end of the tube. The bulging of the side wall which has taken place is of less extent than that shown in Fig. 7. This occurs by reason of the fact that the plastic material is partly forced into the recess 12. In other words, the pressure applied to the plastic material prior to the end pressure on the tubular blank is of less degree. This tends to prevent the splitting of the metal at the outlet and at the margins of the opening 8. This is accomplished by reason of the fact that the extent of flow of the metal during this initial bulging of the side wall in the forming of the branch member is considerably less until pressure is brought to bear on the end of the tube, which shortens the tube and forcibly feeds or flows metal to form the branch outlet. Finally the recesses are filled with the plastic material as shown in Fig. 10, and the tubular branch is completed. The plastic non-compressible material is then extruded to a certain extent through the completed branch tube. The head of the mandrel 11, as noted above, is preferably larger than the section 10, and the section 10 is also preferably dimensioned so that the head contacts with the end walls of the forming dies when the coupling is completed so far as shaping the same by my method.

In Figs. 11 and 12 of the drawing, there is shown a slightly modified arrangement of die. The branch recess 5 into which the metal is extruded is provided with a plunger 13. A spring 14 bears against the plunger and against an abutment pin 15 and normally forces the plunger into contact with the side wall of the blank. This plunger has an opening 16 therein which is in axial alinement with the branch bore or recess in the die. When the non-compressible material is cast in the tubular blank, there will be a protrusion extending from the blank formed by the metal flowing out through the opening. This protrusion is inserted in the opening in the plunger when the parts are assembled, and it serves to aline the opening in the tubular blank with the bore or branch recess into which the metal of the tubular blank is to be extruded. When pressure is applied to the plastic material so as to extrude it with the metal of the tubular blank into the branch bore or recess, the plunger will yield, as shown in Fig. 12.

After the shaping of the branch member has been completed, then the coupling may be removed from the die and the plastic mandrel removed from the shaped coupling. This may be accomplished by applying heat or by pressure applied to the plastic material at one end of the original tubular blank. A plug may be inserted in one end of the tubular blank and by forcing the same through the blank, the plastic material will be sheared from the branch and forced out of the tubular blank, then the portion of the plastic material on the tubular branch can be readily plugged out.

It will be understood that while a T-shaped coupling is shown in the drawing, the invention is not limited to the forming of T-couplings, but may be used for forming branches at opposite sides of a coupling member, or at any desired angle to the coupling member. While lead is referred to as the preferred form of plastic non-compressible material to be used as a mandrel, it will be understood that other materials which can be flowed by pressure may be used.

It is obvious that other forms of apparatus may be used in carrying out the invention, and that the steps of the method described in detail may be modified without departing from the spirit of the invention as set forth in the appended claims.

Having thus described the invention, what I claim as new and desire to secure by Letters Patent, is—

1. The method of forming a seamless tubular coupling having a branch intermediate its ends consisting in forming a tubular blank of uniform cross section, perforating the tubular blank intermediate its ends where the branch is to be formed, confining said tubular blank in a sectional die shaped to conform exteriorly to the coupling which is to be formed, inserting within said tubular blank a plastic form maintaining material having a lower melting point than the metal of the blank, progressively subjecting said plastic form maintaining material to pressure for expanding the tubular blank so as to cause the same to conform to the shape of the sectional die in which said tubular blank is placed.

2. The method of forming a seamless tubular coupling having a branch intermediate its ends consisting in forming a tubular blank of uniform cross section, perforating the tubular blank intermediate its ends where the branch is to be formed, confining said tubular blank in a sectional die shaped to conform exteriorly to the coupling which is to be formed and to the branch that is to be formed thereon, inserting within said tubular blank a plastic form maintaining metal having a lower melting point than the metal of the blank, subjecting the plastic metal to pressure for initiating the branch in the wall of the tubular member around the perforation in said blank, and subsequently progressively subjecting the plastic metal and the ends of the tubular blank to pressure for causing a continued re-shaping of the plastic metal and a flow of the metal in the tubular blank to form in said die the shaped coupling.

ARTHUR LA RUE PARKER.